United States Patent
Peterson

(10) Patent No.: US 6,536,156 B1
(45) Date of Patent: Mar. 25, 2003

(54) FISHING LURE ORGANIZER

(75) Inventor: Leroy L. Peterson, Omaha, NE (US)

(73) Assignee: Sportsstuff, Inc., Omaha, NE (US)

( * ) Notice: Subject to any disclaimer, the term of this patent is extended or adjusted under 35 U.S.C. 154(b) by 0 days.

(21) Appl. No.: 10/154,291

(22) Filed: May 23, 2002

(51) Int. Cl.$^7$ .............................................. A01K 97/04
(52) U.S. Cl. .................................. 43/54.1; 206/315.11
(58) Field of Search ........................... 43/25, 25.2, 26, 43/41, 42.49, 54.1, 57.1, 57.2; 206/315.11, 3, 443, 564; D22/134, 149

(56) References Cited

U.S. PATENT DOCUMENTS

| | | | | |
|---|---|---|---|---|
| 4,653,220 A | * | 3/1987 | Olsen, Sr. ..................... | 43/57.1 |
| 4,825,584 A | * | 5/1989 | Raley .......................... | 43/57.1 |
| 5,052,555 A | * | 10/1991 | Harmon ....................... | 190/111 |
| 5,185,952 A | * | 2/1993 | Bruce ......................... | 206/315.11 |
| 5,209,344 A | * | 5/1993 | Smith .......................... | 206/466 |
| 5,392,557 A | * | 2/1995 | Harmon et al. ........ | 206/315.11 |
| 5,555,671 A | * | 9/1996 | Voight et al. .......... | 206/315.11 |
| 5,601,681 A | * | 2/1997 | Bayro ........................ | 150/147 |

* cited by examiner

Primary Examiner—Charles T. Jordan
Assistant Examiner—Susan Piascik
(74) Attorney, Agent, or Firm—Sturm & Fix LLP

(57) ABSTRACT

A fishing lure organizer that includes two panels pivotally connected by a living hinge. Each of the panels includes a planar base and a number of compartments that define a corrugated outer surface. The corrugated surfaces matingly engage when the panels are moved to a closed position. Fishing lures can be separately stored in each of the compartments out of contact with other lures stored in the organizer. The base and compartments of each panel are formed of transparent material so that each of the lures can be readily identified. When the panels are moved to the open position, the desired lure can be easily removed for use.

19 Claims, 1 Drawing Sheet

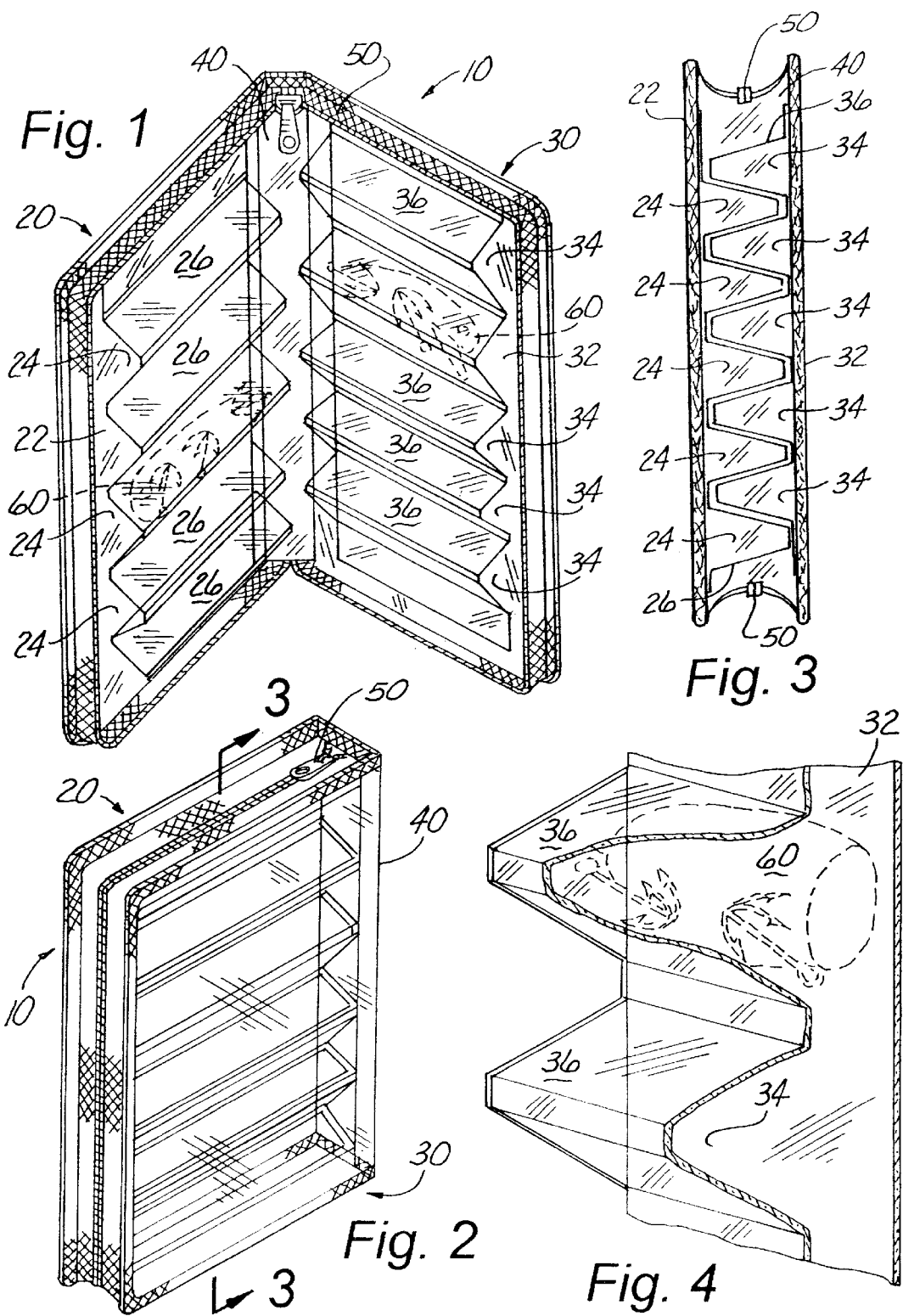

FISHING LURE ORGANIZER

BACKGROUND OF THE INVENTION

1. Field of the Invention

The present invention relates to the field of storage binders, and more particularly to a binder for organizing fishing lures.

2. Description of Related Art

Fishing lures are generally stored in conventional tackle boxes having several small open top compartments overlying a large compartment that forms the bottom of the box. The lures too large for the smaller compartments are typically placed in the large compartment with other lures and tackle and become part of an entangled mass that is difficult to separate. The lures are thus made less accessible to the fisherman since they cannot be readily identified, separated, and removed for use when needed.

As a consequence of the foregoing situation, there has existed a longstanding need for a new and improved fishing lure organizer and the provision of such a construction is a stated objective of the present invention.

BRIEF SUMMARY OF THE INVENTION

Briefly stated, the present invention provides a fishing lure organizer that includes two panels pivotally connected by a living hinge. Each of the panels includes a planar base and a number of compartments that define a corrugated outer surface. The corrugated surfaces matingly engage when the panels are moved to a closed position. Fishing lures can be separately stored in each of the compartments out of contact with other lures stored in the organizer. The base and compartments of each panel are formed of transparent material so that each of the lures can be readily identified. When the panels are moved to the open position, the desired lure can be easily removed for use.

BRIEF DESCRIPTION OF THE SEVERAL VIEWS OF THE DRAWINGS

These and other attributes of the invention will become more clear upon a thorough study of the following description of the best mode for carrying out the invention, particularly when reviewed in conjunction with the drawings, wherein:

FIG. 1 is a perspective view showing the fishing lure organizer of the present invention in the open position, with stored fishing lures illustrated in dashed lines;

FIG. 2 is a perspective view showing the organizer in the closed position;

FIG. 3 is a sectional view taken along line 3—3 of FIG. 2; and

FIG. 4 is an enlarged partial perspective view with portions cut away showing the placement of a lure within one of the compartments.

DETAILED DESCRIPTION OF THE INVENTION

As can be seen by reference to the drawings, and in particular to FIG. 1, the fishing lure organizer that forms the basis of the present invention is designated generally by the reference number 10. The organizer 10 includes a first panel 20 and a second panel 30 pivotally joined by a living hinge section 40. The first panel 20 comprises a planar base 22 and a number of open ended compartments 24 that define a corrugated outer surface 26. The second panel 30 also comprises a planar base 32 with compartments 34 defining a corrugated outer surface 36. The compartments 24 and 34 are off set with respect to each other so that they mesh or matingly engage when the panels 20 and 30 are moved to the closed position shown in FIGS. 2 and 3. A zippered closure 50 acts to selectively secure the first and second panels 20 and 30 in the closed position.

Individual fishing lures 60 may be separately stored in each of the compartments 24, 34 as best shown in FIGS. 1 and 4. Since each base 22, 32, and each outer surface 26, 36 are formed of transparent material, the lures 60 can be easily and quickly identified and removed for use when the panels 20 and 30 are moved to the open position shown in FIG. 1.

Although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

Having thereby described the subject matter of the present invention, it should be apparent that many substitutions, modifications, and variations of the invention are possible in light of the above teachings. It is therefore to be understood that the invention as taught and described herein is only to be limited to the extent of the breadth and scope of the appended claims.

I claim:

1. A fishing lure organizer comprising:

a first panel including a first planar base and a plurality of first compartments attached to the first planar base and defining a first corrugated outer surface dimensioned to receive a fishing lure thereunder;

a second panel pivotally attached to the first panel, the second panel including a second planar base and a plurality of second compartments attached to the second planar base and defining a second corrugated outer surface dimensioned to receive a fishing lure thereunder;

wherein the first panel and second panel are pivotally movable between a first open position, and a second position wherein the first planar base and the second planar base are aligned in spaced parallel relationship and wherein the first corrugated outer surface of the plurality of first compartments matingly engage the second corrugated outer surface of the plurality of second compartments; when the first panel and second panel are disposed in their closed position.

2. The fishing lure organizer of claim 1 further including a closure mechanism attached to the first and second panels, the closure mechanism being disposed to selectively secure the first and second panels in the second closed position.

3. The fishing lure organizer of claim 2 wherein the closure mechanism is a zipper.

4. The fishing lure organizer of claim 1 wherein the first planar base and the second planar base are formed of transparent material.

5. The fishing lure organizer of claim 2 wherein the first planar base and the second planar base are formed of transparent material.

6. The fishing lure organizer of claim 3 wherein the first planar base and the second planar base are formed of transparent material.

7. The fishing lure organizer of claim 1 wherein the plurality of first corrugated outer surface and the second corrugated outer surface are formed of transparent material.

8. The fishing lure organizer of claim 2 wherein the plurality of first corrugated outer surface and the second corrugated outer surface are formed of transparent material.

9. The fishing lure organizer of claim 3 wherein the plurality of first corrugated outer surface and the second corrugated outer surface are formed of transparent material.

10. The fishing lure organizer of claim 4 wherein the plurality of first corrugated outer surface and the second corrugated outer surface are formed of transparent material.

11. The fishing lure organizer of claim 5 wherein the plurality of first corrugated outer surface and the second corrugated outer surface are formed of transparent material.

12. The fishing lure organizer of claim 6 wherein the plurality of first corrugated outer surface and the second corrugated outer surface are formed of transparent material.

13. The fishing lure organizer of claim 1 wherein the first compartments and second compartments are triangular in cross section.

14. The fishing lure organizer of claim 2 wherein the first compartments and second compartments are triangular in cross section.

15. The fishing lure organizer of claim 3 wherein the first compartments and second compartments are triangular in cross section.

16. The fishing lure organizer of claim 4 wherein the first compartments and second compartments are triangular in cross section.

17. The fishing lure organizer of claim 7 wherein the first compartments and second compartments are triangular in cross section.

18. The fishing lure organizer of claim 1; wherein, the first and second compartments have a generally triangular cross section.

19. The fishing lure organizer of claim 1; wherein, the first and second compartments have a generally truncated triangular cross section.

* * * * *